(12) United States Patent
Locke

(10) Patent No.: US 6,684,819 B1
(45) Date of Patent: Feb. 3, 2004

(54) TOY DEVICE FOR AN ANIMAL

(76) Inventor: Carl L. Locke, 2413 W. 6th St., Irving, TX (US) 75060

( * ) Notice: Subject to any disclaimer, the term of this patent is extended or adjusted under 35 U.S.C. 154(b) by 0 days.

(21) Appl. No.: 10/352,502

(22) Filed: Jan. 27, 2003

Related U.S. Application Data

(60) Provisional application No. 60/351,452, filed on Jan. 28, 2002.

(51) Int. Cl.[7] .......................... A01K 29/00; A63H 7/00
(52) U.S. Cl. ..................... 119/707; 273/331; 446/308
(58) Field of Search .................. 119/707, 702, 119/708; 273/317, 331, 335; 446/308, 309, 311, 312, 330, 310

(56) References Cited

U.S. PATENT DOCUMENTS

| | | | | |
|---|---|---|---|---|
| 2,430,971 A | * | 11/1947 | Atlas | 446/323 |
| 2,673,087 A | * | 3/1954 | Bacon | 472/7 |
| 3,391,934 A | * | 7/1968 | Ryan et al. | 273/384 |
| 3,425,700 A | * | 2/1969 | Edwards | 473/147 |
| 3,459,158 A | * | 8/1969 | Mitchell, Jr. | 119/708 |
| 3,565,432 A | * | 2/1971 | Reiner et al. | 273/412 |
| 3,582,075 A | * | 6/1971 | Glass et al. | 273/317 |
| 3,611,996 A | * | 10/1971 | Wegner | 119/707 |
| 3,669,451 A | * | 6/1972 | Welbourn | 273/412 |
| 3,973,774 A | * | 8/1976 | Breslow et al. | 124/79 |
| 4,061,338 A | * | 12/1977 | Goldberg | 273/144 B |
| 4,111,179 A | * | 9/1978 | Hashimoto | 124/7 |
| 4,184,284 A | * | 1/1980 | Rogahn | 446/15 |
| 4,267,799 A | * | 5/1981 | Bacon | 119/61 |
| 4,631,852 A | * | 12/1986 | Whritenour | 43/19 |
| 5,103,770 A | * | 4/1992 | Berkovich | 119/708 |
| 5,119,001 A | * | 6/1992 | Moore et al. | 318/257 |
| 5,267,887 A | * | 12/1993 | Licata et al. | 446/309 |
| 5,435,570 A | * | 7/1995 | Labrasseur | 273/355 |
| 5,467,740 A | * | 11/1995 | Redwine | 119/707 |
| 5,823,844 A | * | 10/1998 | Markowitz | 446/175 |
| 5,881,679 A | * | 3/1999 | Hann | 119/708 |
| 5,941,196 A | * | 8/1999 | Domanski | 119/708 |
| 6,016,771 A | * | 1/2000 | Baiera et al. | 119/708 |
| 6,058,887 A | * | 5/2000 | Silverman | 119/609 |
| 6,318,300 B1 | * | 11/2001 | Renforth et al. | 119/708 |
| 6,361,393 B1 | * | 3/2002 | Seymour | 446/34 |
| 6,401,665 B1 | * | 6/2002 | Gentile | 119/707 |
| 6,510,817 B2 | * | 1/2003 | Horvath | 119/707 |
| 6,537,129 B1 | * | 3/2003 | Kane | 446/323 |
| 2002/0164921 A1 | * | 11/2002 | Wilkinson et al. | 446/308 |

* cited by examiner

*Primary Examiner*—Yvonne Abbott
(74) *Attorney, Agent, or Firm*—George L. Williamson

(57) ABSTRACT

A toy device for an animal wherein a catapulting apparatus is disposed on a base whereupon a toy-like member is catapulted from the apparatus in a horizontal-like trajectory, whereupon the animal will chase and capture the toy-like member. A string is connected between the apparatus and the toy-like member so that the toy-like member is recoiled back upon the base for a repetition of events. A microcontroller is provided for use with the catapult device so that the catapult works on a timing mechanism and operates at a predetermined time interval. The apparatus can be either battery operated or can use conventional 110-volt alternating current as its power source.

8 Claims, 3 Drawing Sheets

TOY DEVICE FOR AN ANIMAL

BACKGROUND OF THE INVENTION

This application claims benefit of U.S. Provisional Application Ser. No. 60/351,452 filed on Jan. 28, 2002.

FIELD OF THE INVENTION

The present invention generally relates to toys, and, more particularly, is concerned with a toy device for an animal.

Description of the Prior Art

Toy devices for animals have been described in the prior art. However, none of the prior art devices disclose the unique features of the present.

In U.S. Pat. No. 5,785,005, dated Jul. 28, 1998, Udelle, et al., described an annular ball track provided with a flat top surface having a material affixed thereon for the purpose of claw scratching. A hollow ball containing an electronic sound synthesizer within is disposed inside the annular track and visible around the periphery of the track. A switch operates the electronic sound synthesizer within the ball and broadcasts mouse related scratching sounds and/or squeaks, thereby serving as an irresistible attractant to an animal for promoting more frequent exercise by swatting and chasing the ball, and to encourage the claw scratching needs inherent to animals, thereby saving articles of furniture from claw damage.

In U.S. Pat. No. 4,517,922, dated May 21, 1985, Lind disclosed a device for the amusement of pets (and in particular cats) which includes a flat horizontal base and a post secured to the base adjacent its periphery which extends upwardly therefrom so that an upper end of the post is positioned over and above a central portion of the base. A coiled spring is secured to the upper end of the post and extends upwardly therefrom so that a free outer end of the coiled spring is positioned over and above the central portion of the base. A pet toy aromatized with catnip is attached to the bottom end of a cord, the top end of which is selectively secured to the free outer end of the coiled spring by a suitable fastener. The pet toy is thus resiliently suspended over the base. In addition, the pet toy, post and base all have durable coverings penetrable by pet claws.

In U.S. Pat. No. 5,074,820, dated Dec. 24, 1991, Nakayama disclosed a stuffed toy comprising a main switch turned on in response to a load applied externally, a vibrator activated when the main switch is turned on to vibrate at least a part of the body of the stuffed toy, and a sound generator generating a sound to the outside while the vibrator is vibrating.

In U.S. Pat. No. 6,039,628, dated Mar. 21, 2000, Kusmiss, et al., disclosed a self-mobile cat toy capable of simulating intermittent life which includes a rodent-like shell partially or wholly containing an electrical power source mechanically and electrically connected to motor-powered wheels or a tread mechanism for moving along the ground. The power circuit includes an orientation-dependent switch which is closed or open depending on its orientation, so that when played with by a cat, the toy will cease to move in certain orientations and begin to move when pawed into other orientations. In another embodiment the powered wheels or tread are replaced by a vibrating mechanism. In yet other embodiments the cat toy is externally controlled by the pet owner, through either a long cable with a switch at the end or through a radio or ultrasonic transmitter-receiver system.

While these toy devices may be suitable for the purposes for which they were designed, they would not be as suitable for the purposes of the present invention, as hereinafter described.

SUMMARY OF THE INVENTION

The present invention discloses a toy device for an animal wherein a catapulting apparatus is disposed in a base whereupon a ball-like member is catapulted from the base in a horizontal-like trajectory, whereupon the animal will chase and capture the ball-like member. A string is connected between the base and the ball-like member so that the ball-like member is recoiled back upon the base for a repetition of events. A timing means is provided for use with the catapult device so that the catapult works on a timing mechanism and operates at a predetermined time interval. The catapult device can be either battery operated or can use conventional 110-volt alternating current as its power source.

An object of the present invention is to provide a toy to keep an animal entertained. A further object of the present invention is to provide a toy for use by an animal that requires little human intervention. A further object of the present invention is to provide a toy device which is simple and has a relatively low manufacturing cost.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
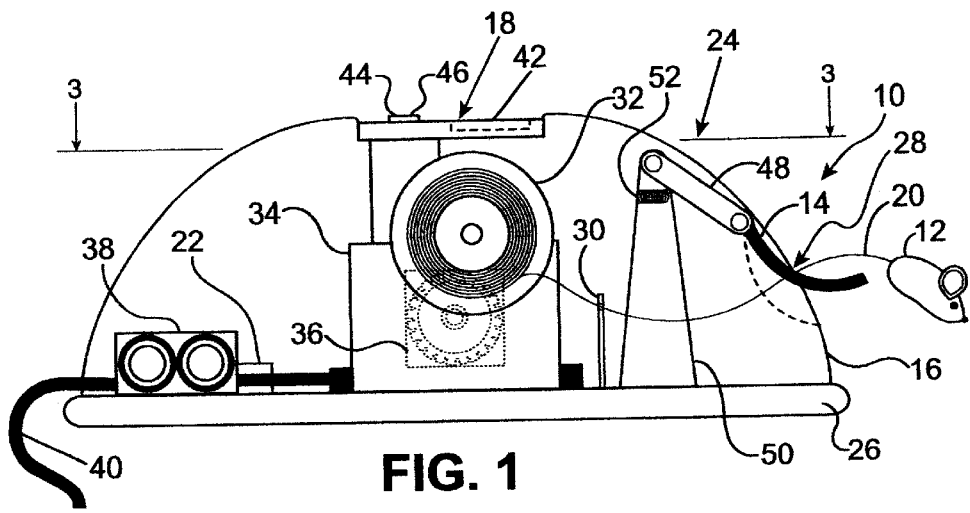
FIG. 1 is an elevation view of the present invention having a transparent cover.

With regard to reference numerals used, the following numbering is used throughout the drawings.

10 present invention
12 ball-like member
14 catapult plate
16 cover
18 programning panel
20 string
22 power supply
24 means for catapulting
26 base
28 aperture 30 eye loop
32 spool of string
34 motor
36 clutch
38 battery
40 alternating current
42 clock
44 timer set button
46 on/off switch
48 flipper arm
50 flipper arm base
52 coil spring
54 electrical connection

DESCRIPTION OF THE PREFERRED EMBODIMENT(S)

In order that the invention may be more fully understood, it will now be described, by way of example, with reference to the accompanying drawing in which FIGS. 1 through 4 illustrate the present invention wherein a toy device for an animal is disclosed.

Figure 2:
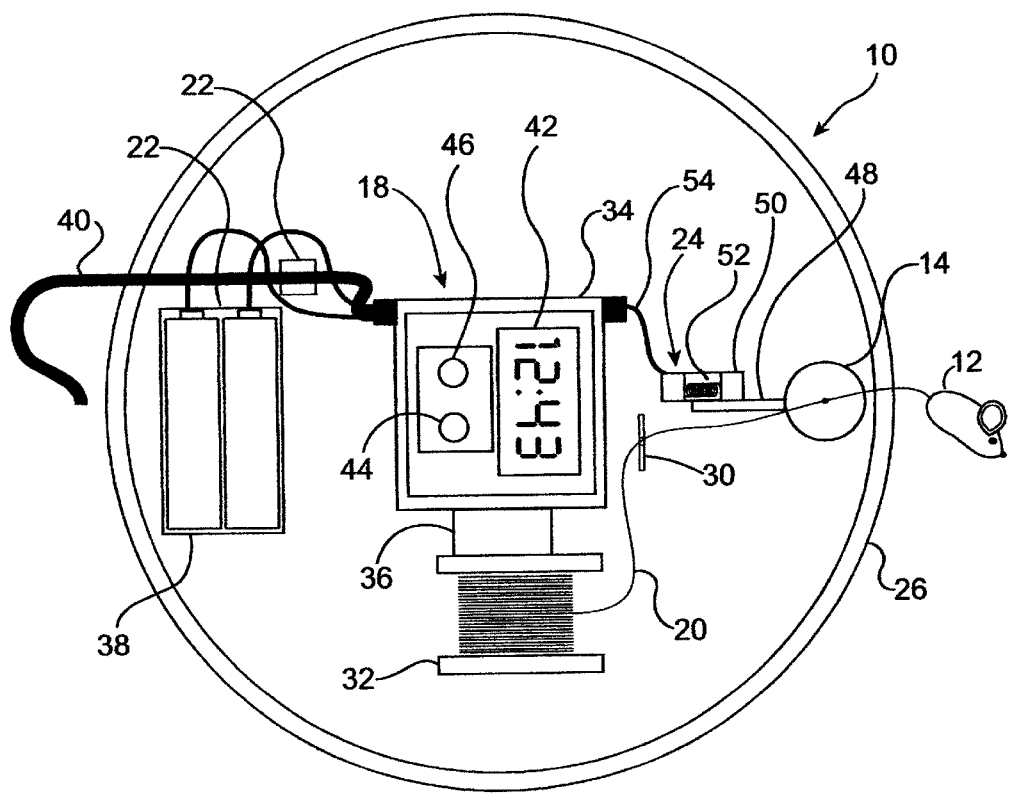
FIG. 2 is a plan view of the present invention having a transparent cover.
Figure 3:
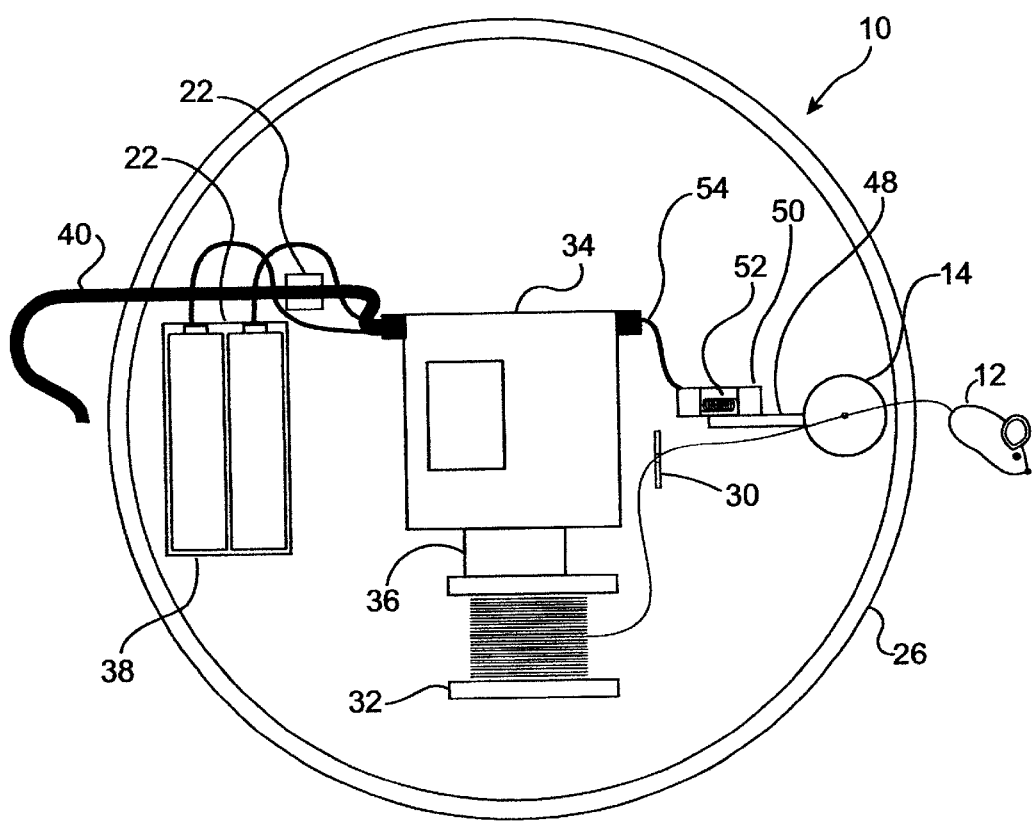
FIG. 3 is a cross-sectional view of the present invention taken from FIG. 1 having a transparent cover.

Turning to FIGS. 1–3, therein is shown the present invention 10 wherein a ball-like or toy-like member 12 rests in an initial position on a catapult plate 14 which catapult plate 14 is attached to a cover 16 which may be transparent and which may be a dome-like member 16 disposed on base member 26. Programming panel 18 containing a microcontroller is shown which provides means for controlling the timing and other functions of the catapult 14 and apparatus so as to provide a catapulting operation at a predetermined time interval and direction. The dome 16 contains catapulting means 24 for operating the catapult member 14 and related mechanism. Also shown is a string 20 which connects the ball-like member 12 to the catapult member 14 whereby the ball-like member can be recoiled to rest upon the catapult member so that it can be tossed again and the operation repeated. The string 20 passes through an aperture 28 centrally disposed in catapult 14 which string then passes through an eye loop 30 and onto a spool 32 of string which spool provides the string supply and rotates in the vertical plane. The spool of string 32 is connected to the motor 34 through a clutch assembly 36 and motor shaft whereby the motor rewinds the spool to retrieve the toy and the clutch 36 prevents the spool of string from being wound so tightly that the string 20 will no longer unwind from spool 32. The catapulting means 24 along with the motor 34 is controlled by a microcontroller contained within the programming panel 18 which panel includes a clock 42 along with a timer set button 44 along with an on/off switch 46 for providing input to the microcontroller. The catapulting means 24 includes a flipper arm 48 which is attached on one end to the catapult 14 and on the other end it is pivotally connected to an upright standing flipper arm base 50 which has a coiled spring 52 connecting the flipper arm 48 to the base 56, so that in one position the flipper arm is rapidly extended or thrust away from the apparatus by the coiled spring 52 as it catapults the toy 12 forward and in a second position the flipper arm 48 is retracted into a recoiled position disposed adjacent the flipper arm base 50 wherein the spring 52 is compressed. Also note that the power source 22 could be either a battery supply 38 or a convention 110-volt alternating current power supply 40. The timer mechanism 18 can provide multiple timing options for use of the present invention. The ball-like member 12 will also fly in different directions. Also shown is electrical connection 54.

Figure 4:
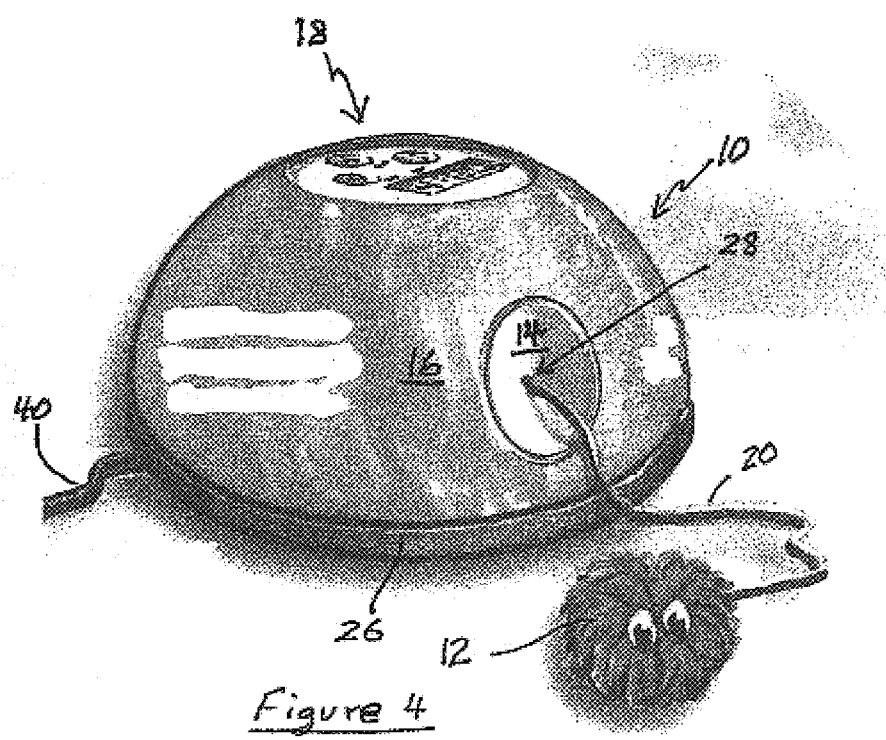
FIG. 4 is a perspective view of the present invention.

Turning to FIG. 4, therein is shown the present invention 10 showing the ball-like toy 12 on string 20, catapult 14 with aperture 28 therein, dome 16 on base 26, programming panel 18, and power cord 40. Dome 16 is horizontally rotatable about the base 26 to allow the toy to be projected in a random direction.

What is claimed to be new and desired to be protected by Letters Patent is set forth in the appended claims:

I claim:

1. An apparatus for catapulting a toy for an animal, comprising:
   a) a base upon which the apparatus is mounted;
   b) a cover disposed on said base;
   c) a toy for being catapulted;
   d) a means for a catapult whereby the toy is catapulted away from the apparatus and then retrieved back to the apparatus;
   e) a string connecting said toy to said means for a catapult;
   f) means for controlling the apparatus whereby the operation of the means for a catapult is controlled; and,
   g) a power supply to provide power for operating the apparatus.

2. The apparatus of claim 1, wherein said cover is rotatably disposed on said base to permit the toy to be catapulted in a random direction.

3. The apparatus of claim 2, wherein said means for a catapult comprises:
   a) a catapult plate disposed on said cover to permit the toy to be catapulted away from the cover, said catapult plate having an aperture therein;
   b) a flipper arm having first and second opposing ends, said first end being connected to said catapult plate;
   c) a flipper arm base, said second end of said flipper arm being disposed on said flipper arm base; and,
   d) a coiled spring having first and second opposing ends, said first end being connected to said flipper arm and said second end being connected to said flipper arm base, wherein said flipper arm compresses said coiled spring when in a retracted position, wherein said coiled spring rapidly extends said flipper arm and thereby said catapult plate away from the apparatus when said coiled spring is in an extended position.

4. The apparatus of claim 3, wherein said means for a catapult further comprises:
   a) a spool for storing said string thereon to permit the string to be unwound from the spool and then rewound onto the spool;
   b) a motor having a drive shaft thereon, said shaft being connected to said spool, wherein said motor rewinds said spool to permit the string to rewind onto the spool and thereby to retrieve the toy;
   c) a clutch disposed between said spool and said motor to prevent the string from being rewound too tightly onto the spool; and,
   d) wherein said string connects said toy to said spool, wherein said string passes through said aperture on said catapult plate.

5. The apparatus of claim 4, wherein said means for controlling the apparatus comprises a microcontroller for controlling the operation of the apparatus, wherein said microcontroller controls the operation of said means for a catapult.

6. The apparatus of claim 5, wherein said microcontroller further comprises:

a) a clock for providing input time into said microcontroller to permit a user to select the time for operation of the various functions of the apparatus;

b) at least one set button to permit a user to input the time and functions for operation of the apparatus; and, c) an on/off control for the apparatus.

7. The apparatus of claim 6, wherein said power supply comprises a battery.

8. The apparatus of claim 7, wherein said power supply comprises alternating current.

* * * * *